(12) United States Patent
Stübner

(10) Patent No.: US 7,245,052 B2
(45) Date of Patent: Jul. 17, 2007

(54) WHEEL HUB DRIVE

(75) Inventor: Frank Stübner, Ernstroda (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 126 days.

(21) Appl. No.: 10/539,295

(22) PCT Filed: Dec. 16, 2003

(86) PCT No.: PCT/EP03/14289

§ 371 (c)(1),
(2), (4) Date: Jun. 16, 2005

(87) PCT Pub. No.: WO2004/058531

PCT Pub. Date: Jul. 15, 2004

(65) Prior Publication Data

US 2006/0113853 A1   Jun. 1, 2006

(30) Foreign Application Priority Data

Dec. 20, 2002   (DE) ................ 102 60 003

(51) Int. Cl.
*H02K 7/02* (2006.01)

(52) U.S. Cl. ............... 310/77; 310/93; 180/65.5; 180/65.6

(58) Field of Classification Search ............ 310/67 A, 310/75 C, 75 R, 76, 77, 92, 93; 180/65.5, 180/65.6
See application file for complete search history.

(56) References Cited

U.S. PATENT DOCUMENTS

| 4,173,269 A | | 11/1979 | Craig |
| 4,445,596 A | * | 5/1984 | Waters et al. ............... 188/171 |
| 4,662,246 A | | 5/1987 | Cheek et al. |
| 5,246,082 A | * | 9/1993 | Alber ....................... 180/65.5 |
| 5,629,101 A | | 5/1997 | Watremez |
| 5,691,584 A | * | 11/1997 | Toida et al. .............. 310/67 R |
| 6,100,615 A | * | 8/2000 | Birkestrand ............... 310/75 C |
| 6,367,571 B1 | * | 4/2002 | Schwarz .................... 180/253 |
| 2002/0121823 A1 | | 9/2002 | Gauthier |

FOREIGN PATENT DOCUMENTS

| DE | 2 133 202 | 1/1973 |
| DE | 23 57 451 | 5/1975 |
| DE | 24 03 463 | 7/1975 |
| DE | 29 07 138 | 9/1979 |
| DE | 89 06 700.2 U1 | 11/1990 |
| DE | 199 04 552 A1 | 9/1999 |
| DE | 695 14 132 T2 | 8/2000 |
| DE | 101 10 844 A1 | 9/2002 |
| EP | 0 811 780 A2 | 12/1997 |
| EP | 0 999 081 A2 | 5/2000 |
| GB | 1 455 069 | 11/1976 |

* cited by examiner

*Primary Examiner*—Dang Le
(74) *Attorney, Agent, or Firm*—Davis Bujold & Daniels, P.L.L.C.

(57) ABSTRACT

A wheel hub drive for a running wheel (10) is described. The drive having a transmission (7), a motor (8) and a brake (11), such that the enveloping circle (9) of the wheel hub drive is determined by the running wheel and the transmission (7), motor (8) and brake are located within a circle whose radius is determined by the running wheel (10).

14 Claims, 1 Drawing Sheet

WHEEL HUB DRIVE

This application is a national stage completion of PCT/EP2003/014289 filed Dec. 16, 2003 which claims priority from German Application Serial No. 102 60 003.1 filed Dec. 20, 2002.

FIELD OF THE INVENTION

The present invention concerns a wheel hub drive.

BACKGROUND OF THE INVENTION

In the prior art, wheel hub drives are usually used in floor trolleys. Since compared with flat or conical gear transmissions, they have the advantage that the transmission, drive motor, brake and wheel take up the least space. In addition, the use of wheel hub drives, enables chassis without through-going axle shafts to be made.

An essential feature of a wheel hub drive is the enveloping circle, i.e., the circle produced around the steering axis when the drive is steered or turned. In wheel hub drives of the prior art, the enveloping circle is determined by the dimensions of the transmission in combination with the motor and brake. This means that the radius of the enveloping circle is relatively large compared with the radius of a circle determined during steering by the turning of the running wheel.

The purpose of the present invention is to indicate a wheel hub drive in which the running wheel is what determines the enveloping circle, so that the smallest possible enveloping circle results.

SUMMARY OF THE INVENTION

In the wheel hub drive, it is proposed to integrate a brake whose dimensions are very compact so that the enveloping circle of the wheel hub drive is determined by the running wheel, the transmission, motor and brake being arranged within a circle whose radius is determined by the running wheel.

According to the invention, the stator of the brake consists of a sheet component or sintered component bolted to the housing cover. In addition, the armature disk is also made from a sheet and connected to the stator with positive locking by way of balls. Moreover, the rotor also consists of a sheet that supports the brake lining and is fixed on the motor shaft by friction force.

The design and very simple structure provides an enveloping circle which is described by the running wheel. This is very advantageous for vehicles with wheel hub drives, since structural space is also made available for the necessary aggregates to be incorporated.

BRIEF DESCRIPTION OF THE DRAWING

The invention will now be described, by way of example, with reference to the accompanying drawings in which.

DETAILED DESCRIPTION OF THE INVENTION

Figure 1:
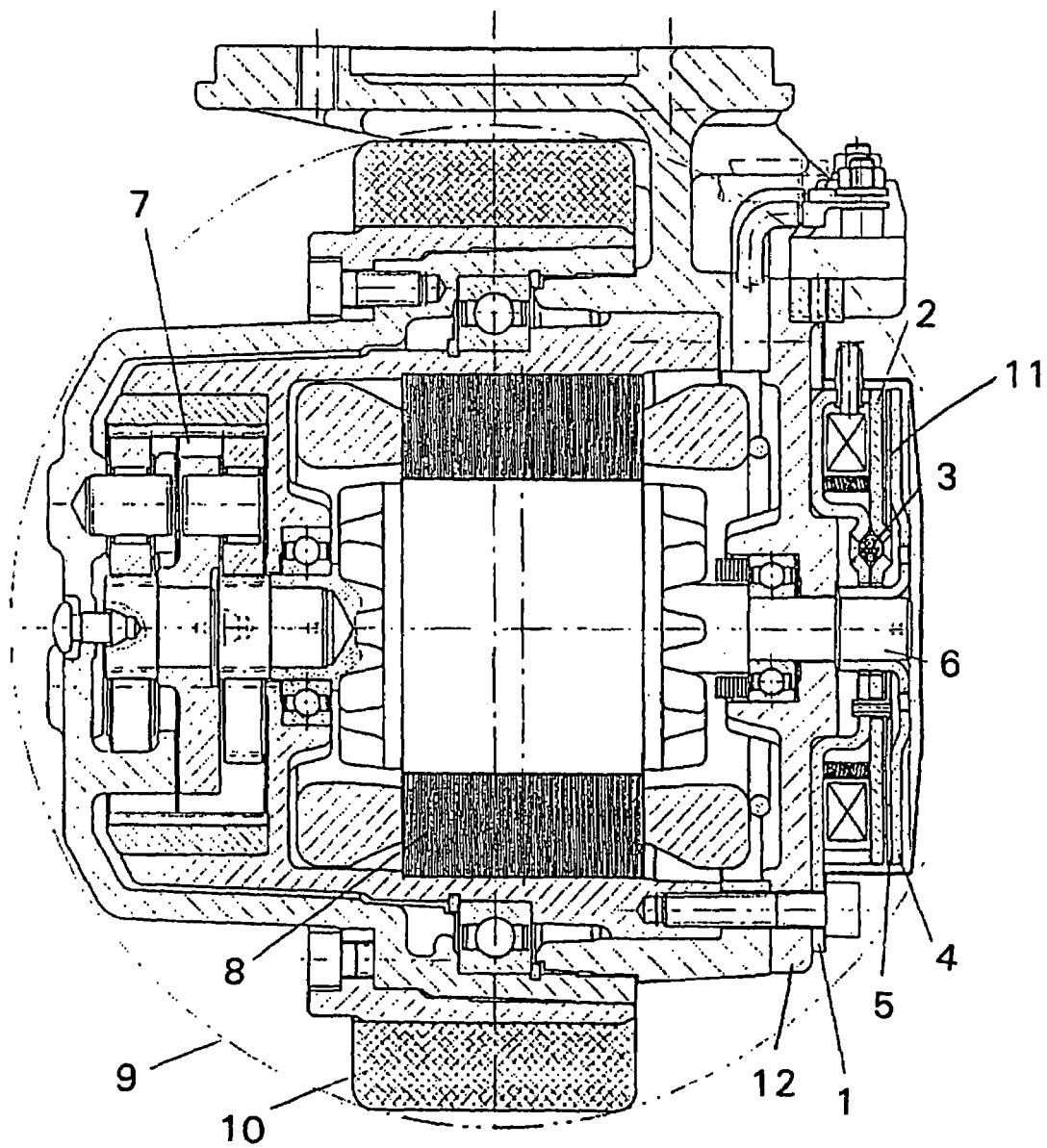
FIG. 1 is a web hub drive according to the invention.

As shown in the figure, the wheel hub drive according to the invention comprises a brake 11, whose stator 1 preferably consists of a sheet or sintered component bolted to the housing cover 12. In this embodiment the stator 1 is connected by positive locking via balls 3 to an armature disk made from sheet. Further, the brake 11 comprises a rotor 4 preferably made from sheet, which supports the brake lining 5 and is fixed on the motor shaft 6 by friction force. If no large braking torques are needed, the wheel hub drive can also be made without a brake lining 5.

The very compact structure shown here enables the transmission 7 and motor 8 (in a plan view of the wheel hub drive according to the figure) to be located within a circle radius which is determined by the running wheel 10, so that the enveloping circle 9 of the wheel hub drive according to the invention is determined by the running wheel 10.

REFERENCE NUMERALS 1 stator
2 armature disk
3 ball
4 rotor
5 brake lining
6 motor shaft
7 transmission
8 motor
9 enveloping circle
10 running wheel
11 brake
12 housing cover

The invention claimed is:

1. A wheel hub drive for a steerable running wheel (10), the wheel hub drive comprising:

a transmission (7), a motor (8) with a motor shaft (6) and a brake (11) with a stator (1), an armature disk (2) and a rotor (4), the motor (8) being arranged between the brake (11) and the transmission (7);

the transmission comprises a planetary transmission and the armature disk (2) is connected by ball bearings (3) to the stator (1) with positive locking so that forces can be transmitted in a radial direction; and wherein the rotor (4) is fixed on the motor shaft (6) and the wheel hub drive defines an enveloping circle (9) encompassing the transmission (7), motor (8) and brake (11) and the steerable running wheel (10) has a steering radius which is substantially the same as a radius of the enveloping circle (9).

2. The wheel hub drive for a steerable running wheel (10) according to claim 1, wherein the stator (1) comprises one of a sheet component and a sintered component.

3. The wheel hub drive for a steerable running wheel (10) according to claim 1, wherein the stator (1) is bolted to a housing cover (12).

4. The wheel hub drive for a steerable running wheel (10) according to claim 1, wherein the armature disk (2) comprises a sheet component.

5. The wheel hub drive for a steerable running wheel (10) according to claim 1, wherein the rotor (4) comprises a sheet.

6. The wheel hub drive for a steerable running wheel (10) according to claim 1, wherein the rotor (4) is fixed to the motor shaft (6) by friction.

7. The wheel hub drive for a steerable running wheel (10) according to claim 1, wherein the rotor (4) supports a brake lining (5).

8. A wheel hub drive for a steerable running wheel (10), the wheel hub drive comprising:
- a transmission (7), a motor (8) with a motor shaft (6) and a brake (11) with a stator (1), an armature disk (2) and a rotor (4), the motor (8) being arranged between the brake (11) and the transmission (7) for driving the steerable running wheel;
- the transmission comprises a planetary transmission and the armature disk (2) is connected by ball bearings (3) to the stator (1) with positive locking so that forces can be transmitted in a radial direction; and
- wherein a first radius defined by the steerable running wheel (10), and a second radius defined by an enveloping circle around the motor (8), transmission (7) and brake (11) are approximately equal.

9. The wheel hub drive for a steerable running wheel (10) according to claim 8, wherein the stator (1) comprises one of a sheet component and a sintered component.

10. The wheel hub drive for a steerable running wheel (10) according to claim 8, wherein the stator (1) is bolted to a housing cover (12).

11. The wheel hub drive for a steerable running wheel (10) according to claim 8, wherein the armature disk (2) comprises a sheet.

12. The wheel hub drive for a steerable running wheel (10) according to claim 8, wherein the rotor (4) comprises a sheet.

13. The wheel hub drive for a steerable running wheel (10) according to claim 8, wherein the rotor (4) is fixed to the motor shaft (6) by friction.

14. The wheel hub drive for a steerable running wheel (10) according to claim 8, wherein the rotor (4) supports a brake lining (5).

* * * * *